Figure 1:
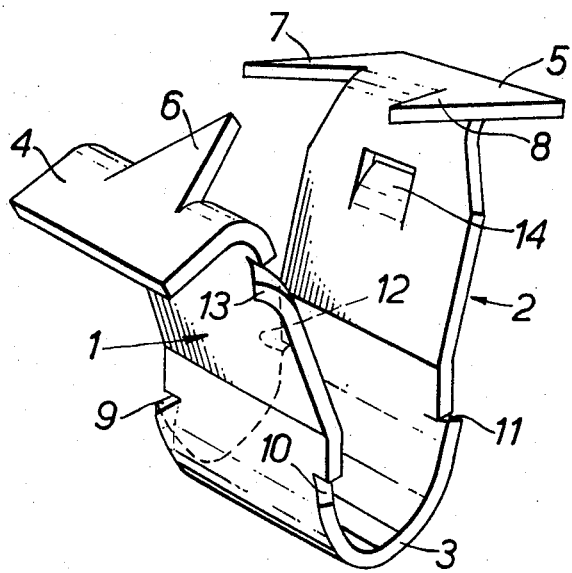

United States Patent
Kindell

[15] 3,673,643
[45] July 4, 1972

[54] HEAT SEAL RETAINING CLIPS

[72] Inventor: Colin David Kindell, Bushey, England
[73] Assignee: AMP Incorporated, Harrisburg, Pa.
[22] Filed: Oct. 26, 1970
[21] Appl. No.: 84,008

[30] Foreign Application Priority Data
Nov. 19, 1969 Great Britain....................56,565/69

[52] U.S. Cl..............................24/73 B, 49/492, 52/716, 126/190
[51] Int. Cl. ...................................................A44b 21/00
[58] Field of Search........................49/492, 493; 126/190; 24/73 FT, 259 TF, 73 B; 52/716, 717

[56] References Cited
UNITED STATES PATENTS
2,219,382 10/1940 Conlon................................49/492 X
2,655,239 10/1953 Kenlock..............................52/716 X Primary Examiner—Donald A. Griffin
Attorney—William J. Keating, Ronald D. Grefe, Gerald K. Kita, Frederick W. Raring, Jay L. Seitchik and John P. Vandenburg

[57] ABSTRACT

A fastener, for reception in a hole in a panel to secure a sealing strip to the panel, comprises a generally U-shaped member of spring metal, the member having a pair of arms which extend away from a bight portion of the member, the free end of the arms being formed with outwardly extending ears and with inwardly extending teeth to grip a sealing strip.

7 Claims, 6 Drawing Figures

HEAT SEAL RETAINING CLIPS

This invention relates to a fastener for use in releasably securing a tubular or other sealing strip to a panel, for example in securing a heat-resisting sealing strip to the door of a cooking oven.

In British Pat. specification No. 838,935 there is disclosed such a fastener comprising a strip of spring steel or other metal of similar resilience and hardness return bent at its central region to provide a pair of spaced arms which in the untensioned condition of the fastener extend in the same general direction approximately parallel one to the other and which are shaped to provide in the untensioned condition of the fastener a snap stud portion, the leading end of which is formed by the bight of the fastener, and the end portions of the fastener strip providing opposed, inwardly extending teeth, the arrangement being such that with the free ends of the arms forced somewhat apart, the fastener may be applied to a sealing strip so that the fastener extends substantially at right angles to the sealing strip and on release of the arms the teeth penetrate the sealing strip and provide it with a snap stud fastening means.

For use, a plurality of such fasteners are secured to a sealing strip at predetermined positions along the strip, and the fasteners then inserted into holes in the member to which the sealing strip is to be secured. This method has the disadvantage that considerable care must be taken to accurately position the fasteners along the strip so that their spacing corresponds to the spacing of the mating holes in the member to which the strip is to be secured. Further, care must be taken that all the fasteners extend in substantially the same direction away from the strip so that the strip does not have to be twisted when being secured to the member, as such twisting may adversely affect the quality and life of the seal provided by the strip.

According to one aspect of this invention a fastener, for reception in a hole in a panel to secure a sealing strip to the panel, comprises a generally U-shaped member of spring metal, the member having a pair of arms which extend substantially parallel away from a bight portion of the member for a first part of their length and then diverge for a second part of their length, the free ends of the arms being formed with outwardly extending ears and with inwardly extending teeth to grip a sealing strip, the first parts of the arms being formed with first outwardly extending projections spaced from the junction between the first and second parts of the arms by a distance substantially equal to the thickness of a panel with which the fastener is to be used, and the second parts of the arms being formed with second outwardly extending projections spaced from the ears of the arms by a distance substantially equal to the thickness of the panel with which the fastener is to be used.

The fastener of this invention has the advantage that it can be positioned and retained in a suitably sized hole in a panel prior to being connected to a sealing strip which is to be secured to the panel. The fastener is first inserted into the hole until the first projections engage the surface of the panel remote from the insertion side of the panel, the fastener being retained in this position by engagement of the panel between the first projections and the second parts of the arms of the fastener. A sealing strip can then be positioned as required on the teeth of the arms and then pushed towards the panel. This action causes the second parts of the arms of the fastener to be urged together by engagement with the edges of the hole in which the fastener is positioned, this in turn causing the teeth of the arms to bite into the sealing strip. The fastener is pushed into the hole until the panel engages between the second projections and the ears of the arms. The fastener is retained in this position and serves to hold the sealing strip against the panel.

Thus, according to another aspect of this invention a method of securing a sealing strip to a panel by means of a generally U-shaped fastener of spring metal, includes the steps of inserting the fastener into a hole in the panel, bight portion leading, until first outwardly extending projections of the arms of the fastener have passed through the hole and engage the surface of the panel remote from the insertion side to secure the fastener to the panel; mounting the sealing strip on teeth formed at the free ends of the arms of the fastener; and pushing the fastener further into the hole until second outwardly extending projections of the arms of the fastener have passed through the hole and engage said surface of the panel thereby to secure the sealing strip to the panel.

These and other objects, features, and advantages of the present invention will be understood in greater detail from the following description and accompanying drawings.

Figure 2:
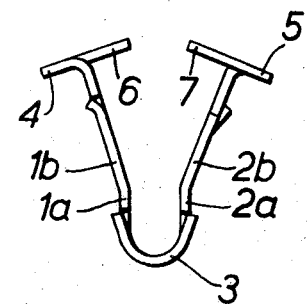
Figure 3:
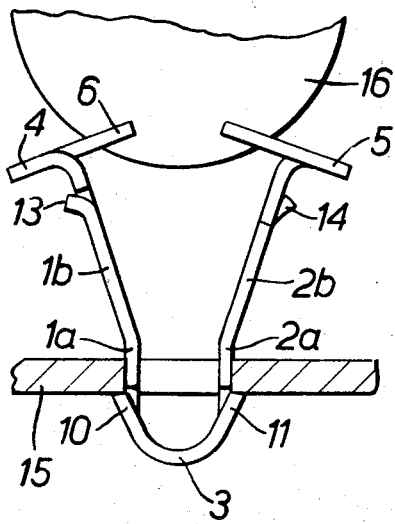
Figure 4:
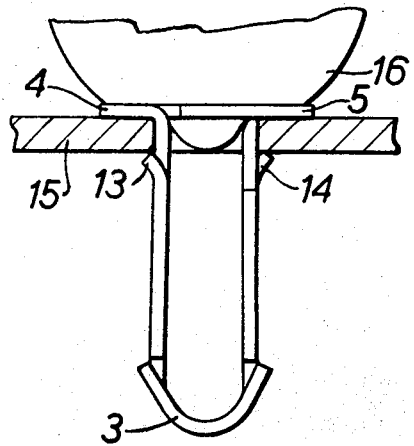
Figure 5:
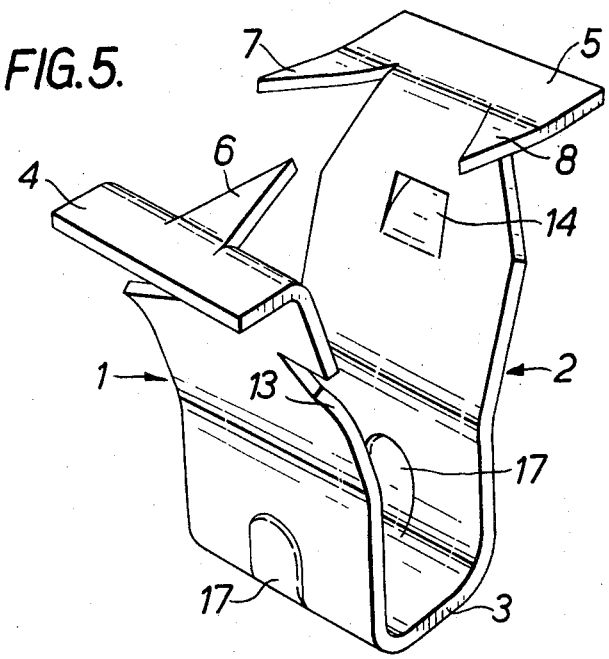
Figure 6:
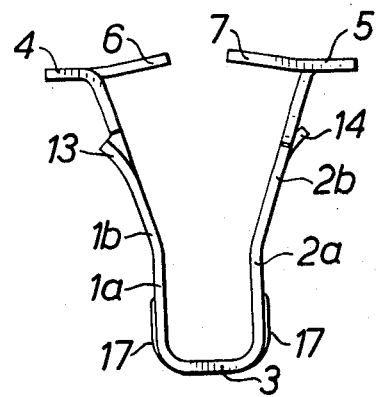

FIG. 1 is a perspective view of a first embodiment;
FIG. 2 is a side elevation of the embodiment of FIG. 1;
FIG. 3 is a side elevation of the embodiment of FIG. 1 positioned in a hole in a panel and with a sealing strip mounted thereon prior to being pushed home into the hole;
FIG. 4 is a side elevation similar to that of FIG. 3 but with the fastener pushed home into the hole in the panel;
FIG. 5 is a perspective view of the second embodiment; and
FIG. 6 is a side elevation of the second embodiment.

The fastener of FIG. 1 comprises a generally U-shaped member of carbon steel having a pair of arms 1 and 2 joined by a bight portion 3. Adjacent the bight portion 3 the arms 1 and 2 have first parts 1a and 2a (FIG. 2) which lie substantially parallel. Beyond the parts 1a and 2a the arms 1 and 2 have second parts 1b and 2b which diverge. The free ends of the arms 1 and 2 are formed to provide outwardly extending ears 4 and 5, and inwardly extending teeth 6, 7 and 8. Barbs 9,10 and 11,12 constituting first outwardly extending projections are formed in the sides of the first arm parts 1a and 2a respectively. Another pair of barbs constituting second outwardly extending projections, of which only one, 13, is shown in FIG. 1, is formed in the second arm part 1b. A barb 14 also constituting a second outwardly extending projection is struck out of the arm part 2b.

The distance separating the arm parts 1a and 2a is determined by the width of a hole in a panel 15, FIG. 3, which is to receive the fastener, and the distance separating each ear 4 or 5 from the barbs or barb 13 or 14 in the associated second arm part 1b or 2b is substantially equal to the thickness of the panel 15.

Further, the distance separating the barbs 9 and 10, or 11 and 12 from the junction between the first and second parts 1a and 1b, or 2a and 2b of the associated arm 1 or 2 is substantially equal to the thickness of the panel 15.

For use, the fastener is inserted into the hole in the panel 15 by pressing the arms 1 and 2 towards each other and passing the fastener into the hole, bight portion 3 leading, from one side of the panel 15, the upper as shown in FIG. 3, until the barbs 9,10,11 and 12 emerge below the underside of the panel 15. The arms 1 and 2 are then released to spring apart to the hole walls, the barbs 9,10,11 and 12 engaging the underside of the panel 15. The fastener is then held to the panel 15 which may be moved, for example on a conveyor belt, without dislodging the fastener. A sealing strip 16, for example a heat seal, is then forced onto the teeth 6,7 and 8 to cause the teeth 6,7 and 8 to bite into the strip 16. Further movement of the strip 16 towards the panel 15 causes the fastener to pass further into the hole until the ears 4 and 5 abut the upper side of the panel 15 and the barbs 13 and 14 engage the underside of the panel 15, as shown in FIG. 4. A portion of the strip 16 is then trapped between the teeth 6,7 and 8, the strip 16 thus being secured to the panel 15.

The hole in the panel 15 is preferably of generally rectangular cross-section and the fastener is especially useful in securing a heat seal 16 composed of a braided asbestos cord to a panel 15 forming an oven door.

The embodiment shown in FIGS. 5 and 6 of the drawings is similar to that of FIGS. 1 to 4 except that the barbs 9, 10, 11 and 12 of FIGS. 1 to 4 are replaced by pressed-out outwardly extending projections 17. This gives the advantage that the projections 17 serve to stiffen the bight portion 3 of the fastener, thus making the fastener more flexible at the junctions between the arm parts 1a and 1b, and 2a and 2b when the fastener is inserted into the hole in the panel 15. Further, whereas in the embodiment of FIGS. 1 to 4 the ears 4 and 5 project substantially perpendicularly from the arm parts 1b and 2b, this being because the fastener is intended to secure a sealing strip 16 to a flat surface of a panel 15, as shown, in the embodiment of FIGS. 5 and 6 the ears 4 and 5 and the arm parts 1b and 2b include an angle greater than 90°, this being because the fastener is intended to secure a sealing strip in a recess in a panel.

I claim:

1. A fastener, for reception in a hole in a panel to secure a sealing strip to the panel, comprising a generally U-shaped member of spring metal, the member having a pair of arms which extend substantially parallel away from a bight portion of the member for a first part of their length and then diverge for a second part of their length, the free ends of the arms being formed with outwardly extending ears and with inwardly extending teeth to grip a sealing strip, the first parts of the arms being formed with first outwardly extending projections spaced from the junction between the first and second parts of the arms by a distance substantially equal to the thickness of a panel with which the fastener is to be used, and the second parts of the arms being formed with second outwardly extending projections spaced from the ears of the arms by a distance substantially equal to the thickness of the panel with which the fastener is to be used.

2. A fastener as claimed in claim 1, in which the first and second outwardly extending projections are in the form of barbs struck out from the arms of the fastener.

3. A fastener as claimed in claim 1, in which the first outwardly extending projections are pressed-out portions of the first arm parts, and the second outwardly extending projections are in the form of barbs struck out from the second arm parts.

4. A fastener as claimed in claim 1, in which one arm carries one tooth and the other arm carries two teeth arranged to pass on either side of the one tooth of the one arm as the arms are closed together.

5. A fastener as claimed in claim 4, in which the one arm carries two second outwardly extending projections one at each side of the second arm part, and the other arm carries a single, central second outwardly extending projection.

6. A fastener as claimed in claim 1, in which the ears extend substantially perpendicularly from the second arm parts.

7. A fastener as claimed in claim 1, in which each ear and the associated second arm part include an angle greater than 90°.

* * * * *